Dec. 1, 1953 M. A. ESTES 2,660,829

ANIMATED ATTACHMENT FOR RECORD PLAYERS

Filed May 6 1952

INVENTOR

MARGARET A. ESTES

BY

Mason Graham

ATTORNEYS

Patented Dec. 1, 1953 2,660,829

UNITED STATES PATENT OFFICE 2,660,829

ANIMATED ATTACHMENT FOR RECORD PLAYERS

Margaret A. Estes, Victorville, Calif.

Application May 6, 1952, Serial No. 286,323

2 Claims. (Cl. 46—118)

My invention has to do with improvements in phonograph record players and, more particularly, has to do with attachments for record players.

Parents often utilize record players to play records of fairy stories and the like for the amusement of children, particularly at bedtime, to the end of having the child listen to the played record while falling asleep. However, merely listening to the words often has the opposite effect of inspiring the child's imagination and causing it to remain awake. I have found that if, while the record is being played, an attachment for the player is used which will provide some slow, visual animation, such as a simulated figure of a mother or grandmother rocking in a rocking chair and reading, so that the child may imagine that the sound is coming from the occupant of the chair, it tends to hold the child's attention and have the desired soothing effect.

It is therefore the principal aim of my invention to provide an attachment for a record player which, in response to movement of the record being played, will provide animation such as visual simulation of a person rocking in a rocking chair or the like.

Further objects will appear hereinafter.

For the purpose of making my invention understood, I shall now describe a presently preferred embodiment thereof, for which purpose I shall refer to the accompanying drawing, although I wish it understood that, except as may appear from the appended claims, I do not intend to limit my invention to the precise details illustrated and described. In the drawing:

Figure 1:
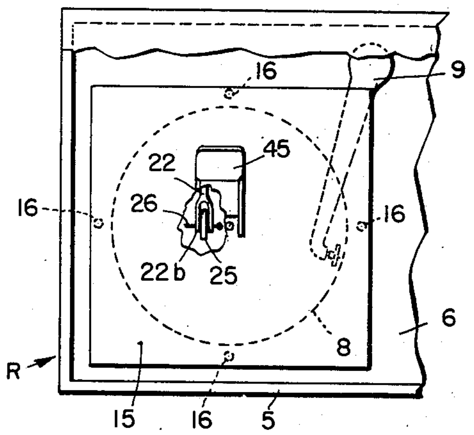
Fig. 1 is a top plan.

Referring now to the drawing, R denotes a conventional record player having a cabinet 5 with a top wall 6 and rotatably mounting a turntable 7 to be driven by a conventional motor M. A phonograph record 8 is mounted on the turntable.

My attachment comprises, in one of its preferred forms, a platform or support 15 having legs 16 of such height that the legs may rest upon the top wall of the cabinet and support the platform in position overlying the record with sufficient clearance for the parts to be described, as well as sufficient clearance for the reproducing arm 9.

Figure 2:
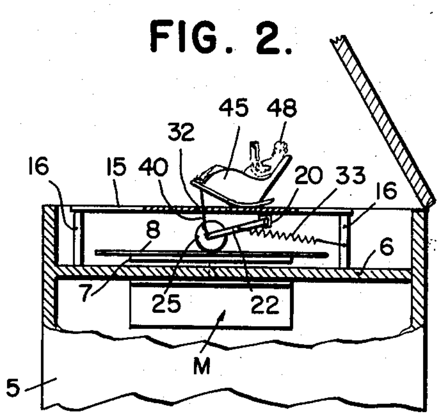
Fig. 2 is a view partly in side elevation and partly in section.
Figure 3:
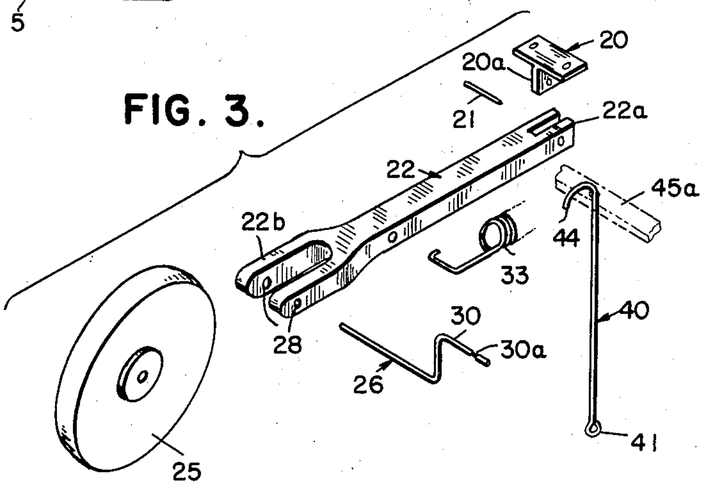
Fig. 3 is an exploded perspective view showing various parts separated.

A T-shaped bracket 20 is secured to the bottom of the platform and has pivoted to its depending leg 20*a*, by a pivot pin 21, an arm 22 bifurcated at its ends 22*a*, 22*b*. Between the bifurcations 22*b* I mount a wheel 25, which may be of any suitable material, the wheel being fixed upon a shaft 26 which extends through holes 28 in the bifurcations and terminates at one end in a crank 30. As best seen in Fig. 2, the wheel is adapted to rotate upon and frictionally engage the record at a point offset from center so that rotation of the record causes the wheel to rotate. To yieldably urge the wheel into frictional engagement with the record, I provide a coiled spring 33, one end of which is secured to one of the legs 16 and the other end of which is secured to the arm 22. A connecting rod or link 40 has an eye 41 at its bottom end which engages over the reduced diameter portion 30*a* of the crank. The link then extends through an elongated hole 32 in the platform and its upper hooked end 44 is engaged over a cross bar portion 45*a* of a toy rocking chair 45 on the platform occupied, for instance, as by a figure 48 simulating a lady reading a book. Other objects may be substituted for the chair and figure.

In operation, after the attachment is placed on the record player, with the wheel 25 in engagement with the record and the record commences its rotation, simultaneously with the playing of the record the rotation of the wheel causes the rocking chair to be rocked, so that the listener not only hears the playing of the record but also can watch the movement of the rocking chair. Of course appropriate decorations may be added to the platform to provide a more homelike effect, such as a reading lamp or the like, not shown.

Figure 4:
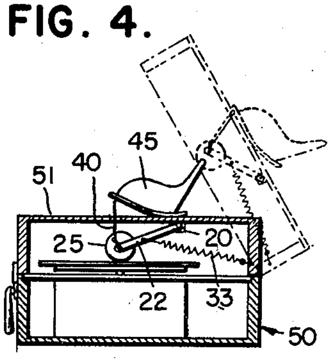
Fig. 4 is a view partly in section and partly in side elevation showing a modified form of device.

In Fig. 4 I show how the attachment may be incorporated as a permanent part of the record player, the particular record player 50 there shown being of the portable type. Here the conventional swingable top cover 40 of the cabinet is substituted for the removable platform 15 before described. The bracket 20 and one end of the spring 33 are secured directly to the cover 40.

I claim:

1. An animated device for a phonograph having a turntable for supporting and rotating a phonograph record, comprising a table-like support providing a platform superposed in vertically spaced relation to the turntable, a rockable object on said platform, said platform having an opening therein, an arm pivotally mounted at one end on said support, a wheel journalled at the other end of said arm, said arm being vertically swingable to permit said wheel to ride on a record on the turntable, a crank on said wheel, and a link received in the opening in said platform and connecting said crank and said rockable object.

2. A device as set forth in claim 1 in which spring means are provided between the arm and the support for yieldably urging the end of the arm carrying the wheel toward said turntable.

MARGARET A. ESTES.

References Cited in the file of this patent

UNITED STATES PATENTS

| Number | Name | Date |
|---|---|---|
| 938,318 | Hall | Oct. 26, 1909 |
| 1,324,068 | Rosenbaum | Dec. 9, 1919 |
| 1,355,612 | Maier | Oct. 12, 1920 |
| 1,427,295 | Jackson et al. | Aug. 29, 1922 |
| 1,430,811 | Johnson et al. | Oct. 3, 1922 |
| 1,475,222 | Converse | Nov. 27, 1923 |
| 1,490,601 | Dodson et al. | Apr. 15, 1924 |
| 1,527,904 | Nater | Feb. 24, 1925 |